Figure 1:
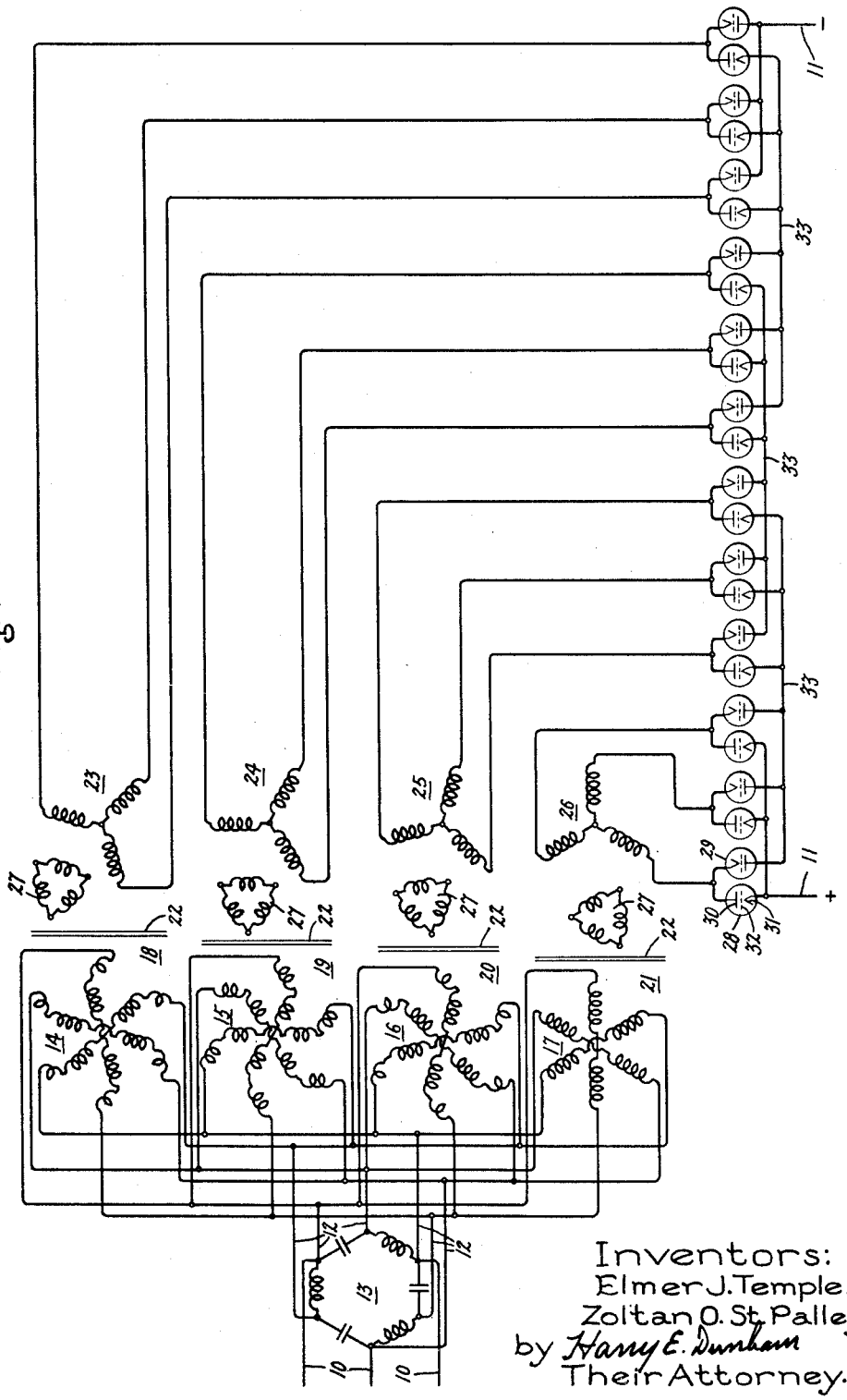

Patented Nov. 9, 1943

2,334,045

UNITED STATES PATENT OFFICE 2,334,045

ELECTRIC TRANSLATING APPARATUS

Elmer J. Temple and Zoltan O. St. Palley, Pittsfield, Mass., assignors to General Electric Company, a corporation of New York Application March 22, 1941, Serial No. 384,712

1 Claim. (Cl. 175—363)

Our invention relates to electric translating apparatus and more particularly to improved electric translating apparatus including electric valve means for transmitting energy in either direction between direct and alternating current circuits or between alternating current circuits of different frequencies.

In transmitting electrical energy between alternating and direct current circuits by electric translating apparatus including electric valves, it is desirable to increase the number of electrically displaced periods of conduction that can be obtained for each complete cycle of the alternating current circuit to improve wave form or diminish the ripple of the direct current voltage. Arrangements have been provided in the past for multiplying the effective number of phases of an alternating current circuit, but many of these have been subject to the disadvantage of requiring a large number of bushings on the high voltage side or of requiring auxiliary phase shifting equipment. These factors have complicated design and increased the cost of production. In accordance with the teachings of our invention, we provide a simplified circuit including transformer means for increasing the effective phases of an alternating current circuit utilizing a simple and practical arrangement of inductive networks.

It is an object of our invention to provide new and improved electric translating apparatus.

It is another object of our invention to provide new and improved electric valve translating apparatus including transformer means having a minimum number of high voltage bushings for the number of effective phases provided.

It is a further object of our invention to provide a new and improved electric valve circuit including phase multiplying transformer means characterized by a high degree of utilization of the windings of the transformer means.

It is still another object of our invention to provide electric transformer means particularly adapted for use in rectifier or inverter circuits of the type employed in high voltage direct current transmission systems.

In accordance with the illustrated embodiment of our invention, a three-phase alternating current circuit and a high voltage direct current circuit are interconnected by transforming means and full wave electric valve converting apparatus. The transformer means includes four simple three-phase star or delta-connected windings associated with the full wave electric valve means and with a plurality of star-connected primary networks having the windings thereof zigzagged to produce fifteen degree phase displacements between the phases of successive ones of the secondary networks. The terms "primary" and "secondary" are used in this specification and the appended claims in the manner in which they would be referred to in an electric valve rectifier. It is apparent that the language is intended to cover the arrangement whether employed for rectification or inversion. The electric valve means associated with each of the secondary networks are connected for full wave operation and are connected in series between the lines of the direct current circuit.

Our invention will be better understood by reference to the following description taken in connection with the accompanying drawings and its scope will be pointed out in the appended claim. In the drawings, Fig. 1 is a diagrammatic representation of an electric valve converting system employing our invention and Fig. 2 is a diagrammatic representation of a modification.

Figure 2:
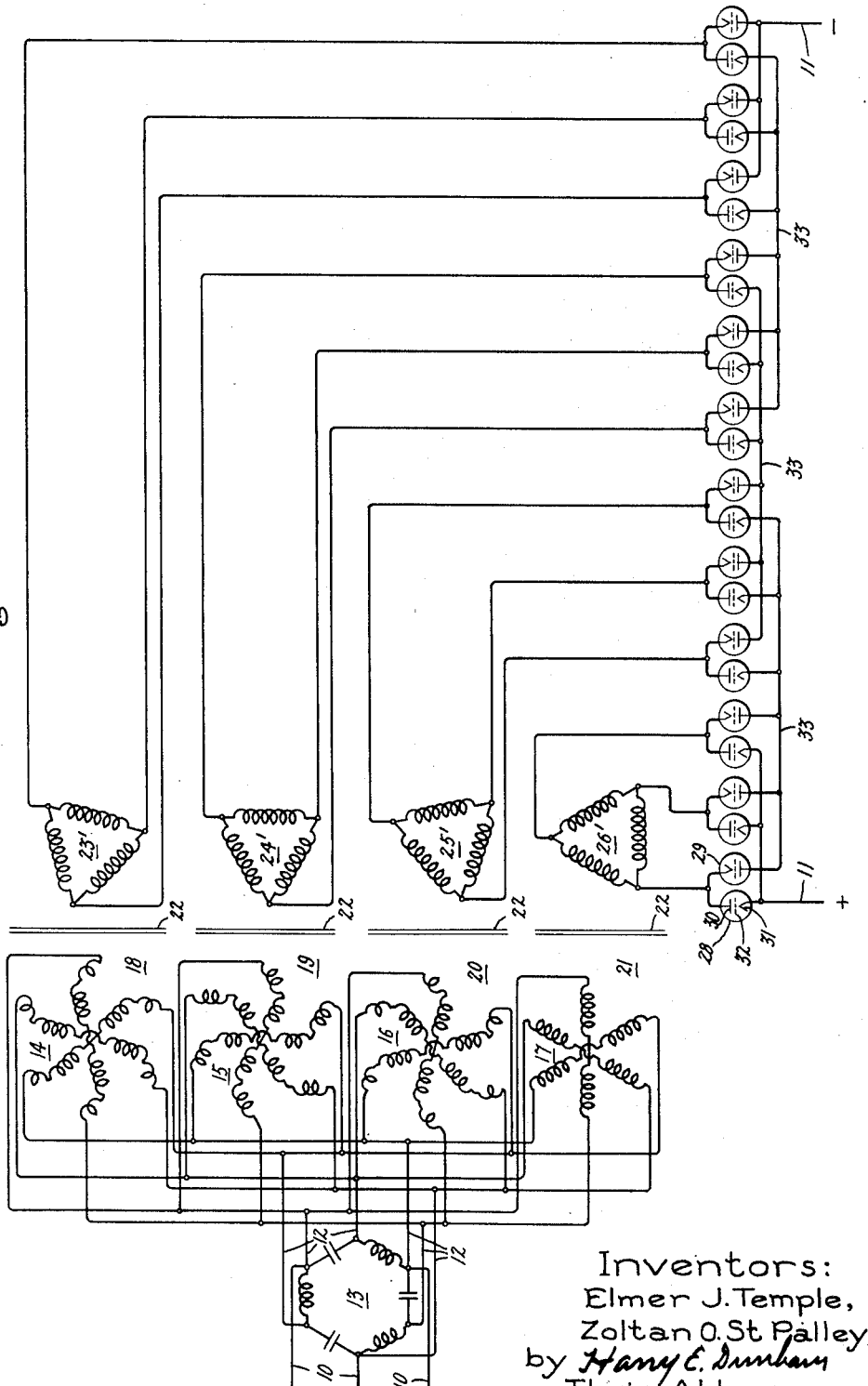

Referring now to Fig. 1 of the drawings, we have shown our invention embodied in an electric valve translating apparatus for transmitting energy between a three-phase alternating current circuit 10 and a high voltage direct current circuit 11. The three-phase alternating current voltage of the constant potential circuit 10 is converted to a three-phase constant current alternating current circuit 12 by a constant potential to constant current transformation network illustrated generally by the numeral 13. In the particular arrangement illustrated, both conductors of each phase of the constant current circuit are brought out from the network and utilized to energize in parallel the star-connected networks 14, 15, 16 and 17 of the transformers 18 to 21, respectively. Each of the transformers includes a core structure represented schematically by the numeral 22 and a simple star or Y-connected three-phase secondary winding 23 to 26, respectively. The primary windings 14 to 16 are made up of long and short coils magnetically arranged in different phase positions and serially connected with respect to the phases of the alternating current circuit 12 to produce fifteen degrees displacement between successive ones of the secondary networks 23 to 26, respectively. The primary winding 17 is a straight diametric winding. For example, network 23 is displaced fifteen degrees in a clockwise direction from the network 24, while network 25 is displaced fifteen degrees in a counter-clockwise direction from the network 24, and network 26 is displaced fifteen degrees in a counter-clockwise direction with respect to the network 25. Inasmuch as no closed winding is provided by the primary and secondary windings of the transformers 18 to 21, each transformer is provided with a mesh connected tertiary winding 27 to provide a path for harmonic currents.

From the preceding description, it is apparent that the transformers 18 to 21 provide means for converting the three-phase alternating current voltage of circuit 10 to four three-phase systems of voltages electrically displaced fifteen degrees with respect to one another. In order to produce twenty-four electrically displaced periods of connection reversely connected electric valve means are associated with each of the phase terminals of the networks 23 to 26, inclusive.

Referring now to the drawings, a pair of reversely connected electric valves 28 and 29 are associated with each of the phase terminals of the networks 23 to 26. The valves may be of any of the types well known in the art and are preferably of the type utilizing an ionizable medium, such as a gas or a vapor. The particular valves illustrated are of the type in which an anode 30, a cathode 31 and a control member or grid 32 are enclosed in a suitable envelope or container. No control circuit has been shown for energizing the control members 32 of the electric valves inasmuch as the present invention is applicable to either controlled or uncontrolled electric valve translating apparatus. The six valves associated with each of the networks 23-26 are arranged in two groups of three with one group having common anode connections and the other group having common cathode connections. The common connections form the positive and negative lines of a direct current circuit. As illustrated in the drawings, the direct current leads of the electric valves systems associated with each of the networks 23-26 are connected in series by the conductors 33 so that the direct current voltage of the circuit 11 is equal to the sum of the direct current voltages of the electric valve system associated with each of the networks 23-26. Inasmuch as each of the networks is electrically displaced fifteen electrical degrees and the full wave connection of the individual networks produces six periods of conduction displaced by sixty electrical degrees, the four networks 23-26 combined with the valves associated therewith produce twenty-four periods of electrically displaced periods of conduction. In this way each of the phase windings of the inductive networks 23-26 are utilized for two conducting periods for each cycle of the alternating current circuit 10. Hence, for full 120-degree conduction during each half cycle this means that the winding is utilized over 240 electrical degrees or two-thirds of the time. This factor combined with the simplicity of the simple star secondaries on the high voltage side render translating apparatus embodying our invention particularly advantageous for use in high voltage circuits such as encountered in high voltage direct current transmission.

The modification shown in Fig. 2 is very similar to that shown in Fig. 1 with the exception that simple mesh or delta connected secondaries are provided instead of the Y-connected networks 23-26. The same numbers have been used to designate the various parts of the circuit in Fig. 2 as were employed in connection with Fig. 1 with the exception of the secondary windings which have been designated 23'-26', inclusive. It will be apparent to those skilled in the art that each of the delta-connected secondaries will be displaced thirty degrees with respect to the Y-connected secondaries associated with the same primary windings. However, the four windings are displaced with respect to each other by fifteen electrical degrees as in the case of the Y-connected windings in Fig. 1. Inasmuch as the secondary windings 23'-26' provide a closed path for harmonic current, it is unnecessary to provide the tertiary windings provided in the arrangement shown in Fig. 1.

It is believed that the operation of the arrangement of Fig. 2 will be readily understood from the description of the operation of the arrangement shown in Fig. 1.

While we have shown and described particular embodiments of our invention, it will be obvious to those skilled in the art that changes and modifications may be made without departing from our invention, and we therefore aim in the appended claim to cover all such changes and modifications as fall within the true spirit and scope of our invention.

What we claim as new and desire to secure by Letters Patent of the United States is:

A polyphase constant voltage alternating current circuit, a high voltage direct current circuit of constant current, electric translating apparatus interconnecting said circuits including a constant voltage-constant current transformation network including six terminals on the constant current side, four six-phase diametric networks energized in parallel from said terminals, a plurality of identical three-phase networks each associated with one of said diametric windings, said diametric windings being zigzagged to produce fifteen-degree displacements between successive ones of said identical networks, reversely connected electric valve means associated with each of the phase terminals of said identical networks so that current may be conducted during both half cycles of voltage of each of said terminals to provide twenty-four electrically displaced periods of conduction, and means connecting the electric valves associated with each of said identical networks in series so that the voltage of said direct current circuit is the sum of the voltages of said identical networks.

ELMER J. TEMPLE.
ZOLTAN O. ST. PALLEY.